United States Patent [19]
Speirs

[11] Patent Number: 5,857,568
[45] Date of Patent: Jan. 12, 1999

[54] BRIEFCASE ADAPTER FOR A PORTABLE COMPUTER

[75] Inventor: John D. Speirs, 325 Oak Leaf Cir., Lake Mary, Fla. 32746

[73] Assignee: John D. Speirs, Hendersonville, N.C.

[21] Appl. No.: 804,562

[22] Filed: Feb. 24, 1997

[51] Int. Cl.⁶ .................................................. B65D 85/30
[52] U.S. Cl. ........................ 206/320; 206/576; 206/592; 190/110
[58] Field of Search ................................. 206/320, 576, 206/305, 591, 592, 594, 521; 190/109, 110

[56] References Cited

U.S. PATENT DOCUMENTS

| | | | |
|---|---|---|---|
| 2,479,269 | 8/1949 | Schneider | 190/109 |
| 2,628,694 | 2/1953 | Kushner | 190/109 |
| 4,106,597 | 8/1978 | Shook et al. | 190/110 |
| 4,602,715 | 7/1986 | Sarver et al. . | |
| 4,837,590 | 6/1989 | Sprague . | |
| 4,890,705 | 1/1990 | Pineda | 190/110 |
| 4,929,948 | 5/1990 | Holmberg | 190/110 |
| 5,010,988 | 4/1991 | Brown | 206/320 |
| 5,105,338 | 4/1992 | Held | 206/305 |
| 5,115,893 | 5/1992 | Terkildsen . | |
| 5,178,246 | 1/1993 | Kramer . | |
| 5,217,119 | 6/1993 | Hollingsworth . | |
| 5,226,540 | 7/1993 | Bradbury . | |
| 5,242,056 | 9/1993 | Zia et al. . | |
| 5,379,893 | 1/1995 | Ruiz . | |
| 5,437,367 | 8/1995 | Martin . | |
| 5,485,922 | 1/1996 | Butcher . | |
| 5,494,157 | 2/1996 | Golenz et al. . | |

*Primary Examiner*—Paul T. Sewell
*Assistant Examiner*—Luan K. Bui
*Attorney, Agent, or Firm*—Carlton Fields; Andrew C. Greenberg

[57] ABSTRACT

A briefcase adapter for carrying a portable computer in a briefcase comprising a panel for partitioning the briefcase into an upper and a lower compartment and an adjustable frame including a front frame member and a rear frame member held in substantially parallel spaced relationship relative to each other by a pair of side frame members disposed in substantially parallel spaced relationship to each other and disposed in substantially perpendicular relationship to the front frame member and the rear frame member, front and rear frame member adjustment assemblies to selectively and lockably adjust the length of the front and rear frame members for frictionally holding the adjustable frame in place within the briefcase, side frame member adjustment assemblies to selectively and lockably adjust the spacing between the front and rear frame members, and a frame adjustment assembly to selectively and lockably adjust the spacing between the side frame members to selectively adjust the substantially rectangular compartment or area cooperatively formed between the front and rear frame members and the side frame members to accommodate the portable computer.

22 Claims, 6 Drawing Sheets

BRIEFCASE ADAPTER FOR A PORTABLE COMPUTER

BACKGROUND OF THE INVENTION

1. Field of the Invention

A briefcase adapter to store and carry a portable computer in a briefcase.

2. Description of The Prior Art

Travellers often carry computers within "soft" or "hard" carry cases specifically designed for holding the computer, but generally find the use of a separate and dedicated piece of luggage inconvenient. Due to the familiar shape and texture of cases specially designed for portable computer such as laptops and notebook computers, and due to the popularity and high commercial value of their contents, such cases are ideal targets for thieves in airports and similar public places. Luggage specifically designed to carry electronic equipment is well-known in the art.

U.S. Pat. No. 4,602,715 discloses a shipping container for electronic components including built-in nested container portions using layers of resilient foam material which form fit to surface features of the component being shipped and partitions fitting within grooves on the wall of the interior portion.

U.S. Pat. No. 4,837,590 describes a mobile office comprising a carrying case having a hollow rectangular base and a cover hingedly connected thereto with a lap-top computer mounted upon and anchored to one built-in platform contained therein and an electronic printer is mounted upon and anchored to another built-in platform. The cover includes a storage chamber for a multiple chamber collapsible manifold and a second chamber with a cover to mount and close a cellular telephone and modem.

U.S. Pat. No. 5,010,988 shows a carrying case specifically adapted for use in carrying lap top computers, printers, fax machines and the like comprising a case having an outer shell formed of a durable waterproofed material and a case interior including a main storage compartment and a secondary storage compartment. The carrying case may further include a shock barrier comprising a layer of shock absorbent material fitted between the exterior shell and an inner lining.

U.S. Pat. No. 5,115,893 teaches a carrying case and portable writing desk including an exposed exterior broad surface structured as a working surface having various writing materials affixed thereon.

U.S. Pat. No. 5,178,246 discloses a component carrying case with a plurality of individual storage compartments covered by sliding transparent sheets.

U.S. Pat. No. 5,217,119 relates to a rectangular carrying case for a laptop computer or other delicate electronic instrument comprising a suspension system including a cradle suspended from the front and rear walls thereof for receiving a laptop computer and elastic panel members to support the cradle for absorbing shocks and impacts.

U.S. Pat. No. 5,226,540 teaches an air and water tight carrying case for transporting a portable work station having a personal computer, printer and other peripherals with external controls built into the outside of the case to permit operation of the work station when the carrying case is closed.

U.S. Pat. No. 5,242,056 discloses a portable office carrying case having a built-in base fabricated of ridged material and at least the front and back sides fabricated of ridged material to protect electronic equipment such as a portable computer.

U.S. Pat. No. 5,379,893 describes an attache case with a partition built into the case whose upper surface supports a laptop or notebook computer. The computer is removably affixed to the partition by hook and loop fasteners or the like that can be repositioned to accommodate different computers.

U.S. Pat. No. 5,437,367 teaches a carrying case for electronic components such as a lap top computer, printer, CD-ROM, and the like, the case with built-in shelves foldable from a stowed position to a lockable use position.

U.S. Pat. No. 5,485,922 discloses a portable computer carry case assembly to transport a portable computer, computer printer and other accessories with various built-in support members to receive the portable computer suspended such that the keyboard portion of the portable computer will be co-planar with a top edge of the main housing and straddle the portable computer to prevent sliding within the top compartment.

U.S. Pat. No. 5,494,157 describes a computer case with a built-in "C" shaped rigid frame and corresponding shock absorbing pad for a computer.

Despite these numerous efforts, however, the prior art continues to exhibit various deficiencies in that it does not provide an inexpensive means for carrying and concealing a portable computer in a more traditional rigid briefcase without specially modifying the briefcase with built-in compartments and features. The present invention improves upon the prior art while providing an effective and safe means for carrying portable computers.

OBJECTIVE AND SUMMARY OF THE INVENTION

It is an objective of the present invention to provide a removable adapter for concealing and safely carrying a portable computer such as a notebook or laptop computer in a standard briefcase.

It is another objective of the present invention to provide a low-cost alternative configured for use with luggage already owned by a person to compete with luggage specially constructed for carrying a computer.

It is another objective to provide a removable adapter that can be disassembled and compactly stored so that the briefcase can be used when the user is not carrying a computer.

BRIEF DESCRIPTION OF THE DRAWINGS

For a fuller understanding of the nature and object of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENTS

Figure 1:
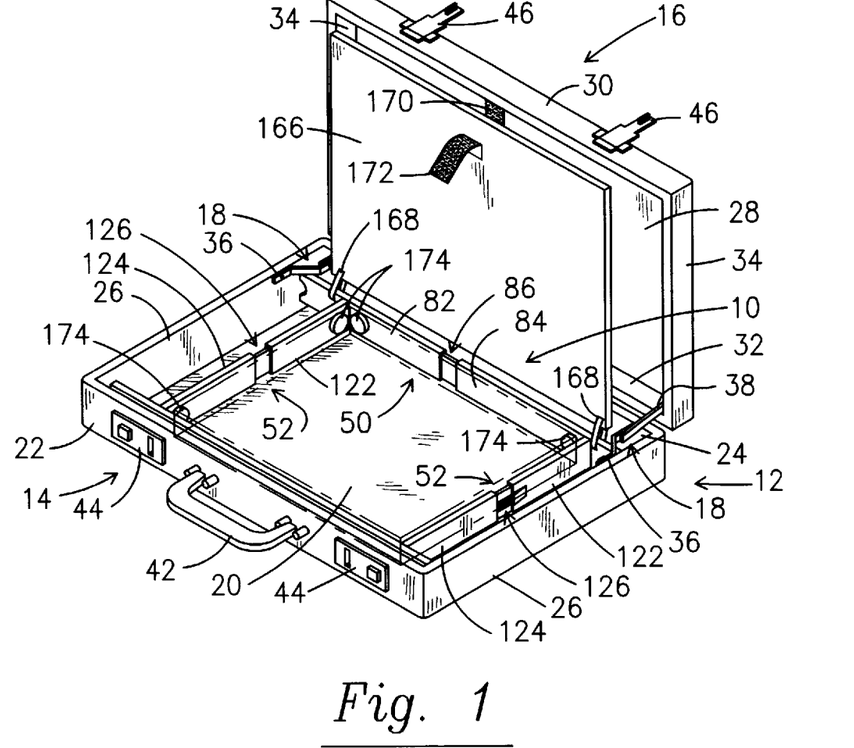
FIG. 1 is a perspective view of the briefcase adapter of the present invention installed in a briefcase.
Figure 4:
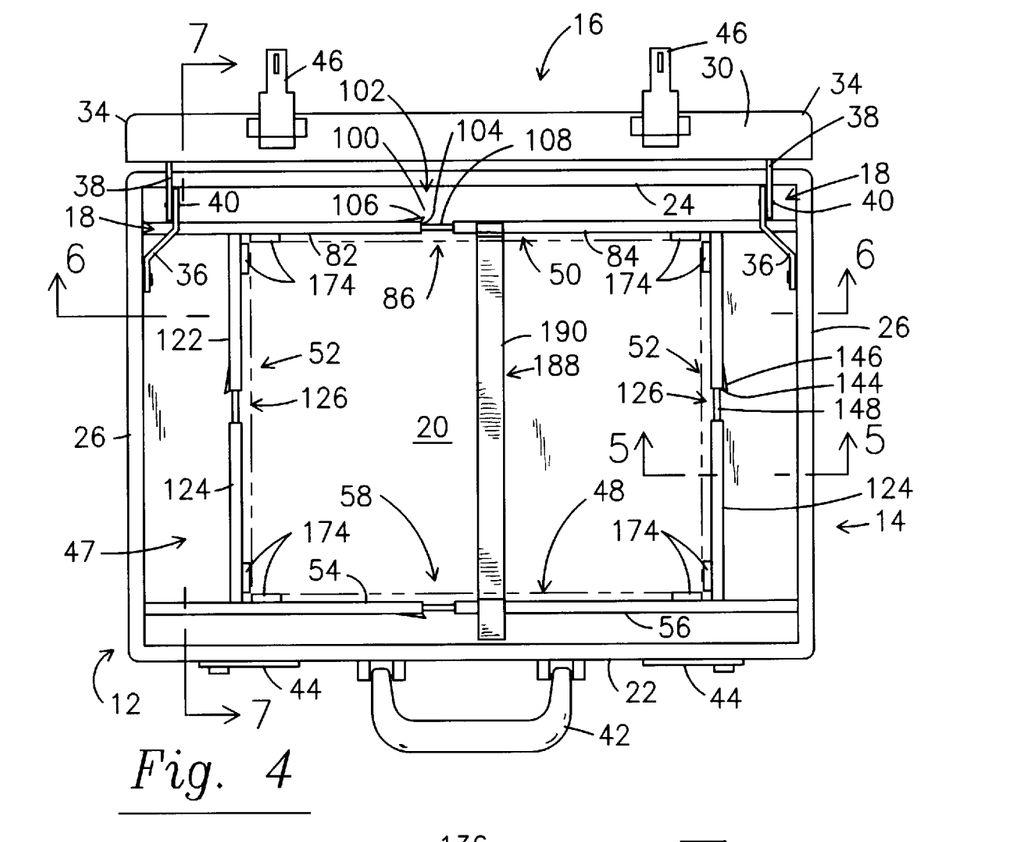
FIG. 4 is a top view of the briefcase adapter of the present invention installed in a briefcase.

As best shown in FIGS. 1 and 4, the present invention relates to a briefcase adapter generally indicated as 10 for carrying a portable computer (not shown) in a briefcase generally indicated as 12. The briefcase 12 comprises a receptacle including a lower briefcase portion generally indicated as 14 having an upper briefcase portion generally indicated as 16 hingedly attached thereto by a pair of hinges each generally indicated as 18 to selectively open and close the briefcase 12 to permit access to the interior thereof when in the open position and to secure the interior thereof including the briefcase adapter 10 and portable computer (not shown) disposed therein when in the closed position.

As shown in FIGS. 1 and 4, the lower briefcase portion 14 comprises a substantially flat bottom panel 20 having a lower front wall and a lower rear wall indicated as 22 and 24 respectively disposed in substantially parallel spaced relationship relative to each other and a pair of lower side walls each indicated as 26 disposed in substantially parallel spaced relationship relative to each other and disposed in substantially perpendicular relationship relative to the lower front and lower rear walls 22 and 24 to cooperatively form a lower peripheral wall. The upper briefcase portion 16 comprises a substantially flat top panel 28 having an upper front wall and an upper rear wall indicated as 30 and 32 respectively disposed in substantially parallel spaced relationship relative to each other and a pair of upper side walls each indicated as 34 disposed in substantially parallel spaced relationship relative to each other and disposed in substantially perpendicular relationship relative to the upper front and upper rear walls 30 and 32 to cooperatively form an upper peripheral wall.

As shown in FIGS. 1 and 4, each hinge 18 comprises a first and second hinge member indicated as 36 and 38 respectively affixed to the corresponding lower side wall 26 and the corresponding upper side wall 34 and rotatably coupled together by a corresponding hinge pin 40 or other suitable coupling means to permit the opening and closing of the briefcase 12. The briefcase 12 further includes a handle 42 and a pair of latches each comprising a first latch element 44 and a corresponding second latch element 46 to cooperatively engage each other to secure the upper briefcase portion 16 to the lower briefcase portion 14 when in closed position to maintain the briefcase 12 in the closed configuration.

Figure 2:
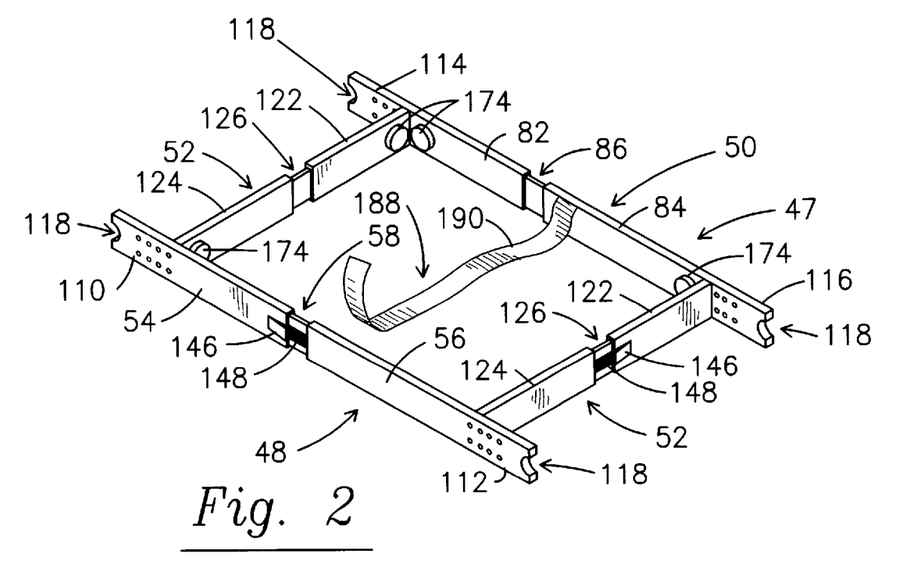
FIG. 2 is a perspective view of the adjustable frame of the present invention.
Figure 3:
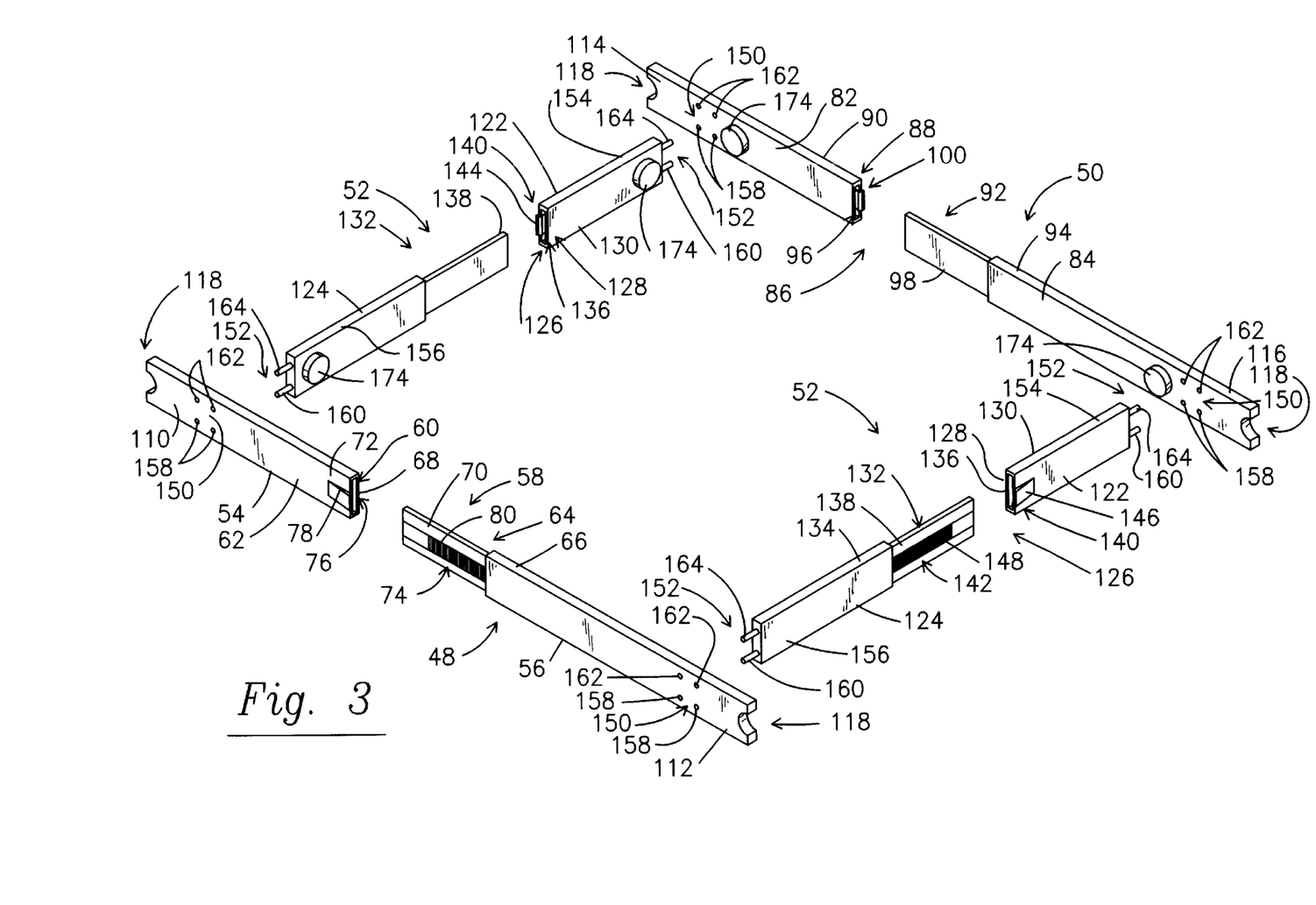
FIG. 3 is an exploded perspective view of the adjustable frame of the present invention.

As best shown in FIGS. 2 and 3, the briefcase adapter 10 comprises an adjustable frame generally indicated as 47 including a front frame member and a rear frame member generally indicated as 48 and 50 respectively held in substantially parallel spaced relationship relative to each other by a pair of side frame members each generally indicated as 52 disposed in substantially parallel spaced relationship to each other and disposed in substantially perpendicular relationship to the front frame member 48 and the rear frame member 50.

The front frame member 48 comprises a first and second front frame section indicated as 54 and 56 respectively slidably coupled together by a front frame member adjustment assembly generally indicated as 58 to permit relative movement therebetween to adjust the overall length of the front frame member 48 to accommodate briefcases 12 of various widths. The front frame member adjustment assembly 58 comprises a first front frame adjustment element generally indicated as 60 formed on the inner end portion 62 of the first front frame section 54 and a second front frame adjustment element generally indicated as 64 formed on the inner end portion 66 of the second part frame section 56 configured to cooperatively engage each other and maintain the first front frame section 54 and the second front frame section 56 in coplanar alignment relative to each other. The first front frame adjustment element 60 comprises a slot 68 and the second front frame adjustment element 64 comprises a tongue 70 configured and dimensioned to be slidingly disposed within the slot 68 to allow longitudinal adjustment therebetween. The front frame member adjustment assembly 58 further includes a front frame lock assembly to selectively lock or secure the longitudinal position of the second front frame section 56 relative to the first front frame section 54. In particular, the front frame lock assembly comprises a first front frame lock element generally indicated as 72 formed on the first front frame section 54 adjacent the first front frame adjustment element 60 and a second front frame lock element generally indicated as 74 formed on the second front frame section 56 adjacent the second front frame adjustment element 64. The first front frame lock element 72 comprises a tooth 76 coupled to the first front frame section 54 by a flexible member 78 movable between a first or locked position and a second or unlocked position as described more fully hereinafter. The second front frame lock element 74 comprises a plurality of grooves and ridges 80 disposed to engage the tooth 76 when in the first or locked position.

The rear frame member 50 comprises a first and second rear frame section indicated as 82 and 84 respectively slidably coupled together by a rear frame member adjustment assembly generally indicated as 86 to permit relative movement therebetween to adjust the overall length of the rear frame member 50 to accommodate briefcases 12 of various widths. The rear frame member adjustment assembly 86 comprises a first rear frame adjustment element generally indicated as 88 formed on the inner end portion 90 of the first rear frame section 82 and a second rear frame adjustment element generally indicated as 92 formed on the inner end portion 94 of the second rear frame section 84 configured to cooperatively engage each other and maintain the first rear frame section 82 and the second rear frame section 84 in coplanar alignment relative to each other. The first rear frame adjustment element 88 comprises a slot 96 and the second rear frame adjustment element 92 comprises a tongue 98 configured and dimensioned to be slidingly disposed within the slot 96 to allow longitudinal adjustment therebetween. The rear frame member adjustment assembly 86 further includes a rear frame lock assembly to selectively lock or secure the longitudinal position of the second rear frame section 84 relative to the first rear frame section 82. In particular, the rear frame lock assembly comprises a first rear frame lock element generally indicated as 100 formed on the first rear frame section 82 adjacent the first rear frame adjustment element 88 and a second rear frame lock element 102 formed on the second rear frame section 84 adjacent the second rear frame adjustment element 92. The first rear frame lock element 100 comprises a tooth 104 coupled to the first rear frame section 82 by a flexible member 106 movable between a first or locked position and a second or unlocked position as described more fully hereinafter. The second rear frame lock element 102 comprises a plurality of grooves and ridges 108 disposed to engage the tooth 76 when in the first or locked position.

Figure 5:
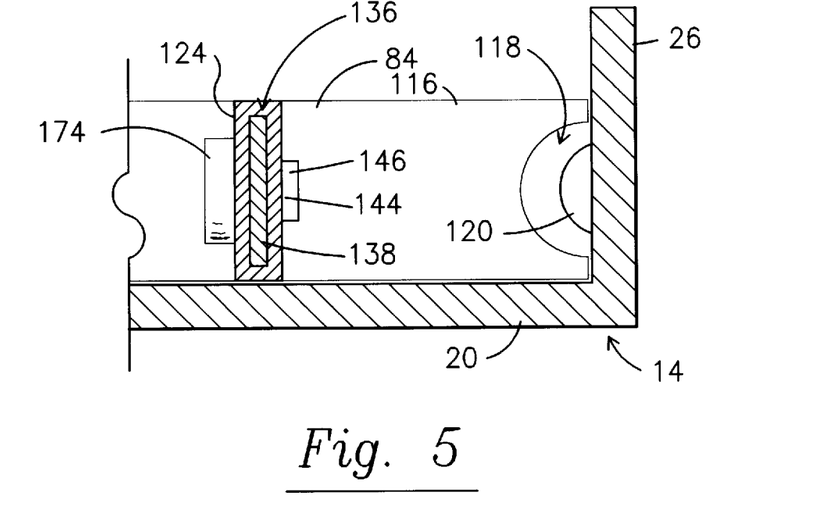
FIG. 5 is a partial cross-sectional front view of the adjustable frame of the present invention installed in a briefcase taken along line 5—5 of FIG. 4.
Figure 6:
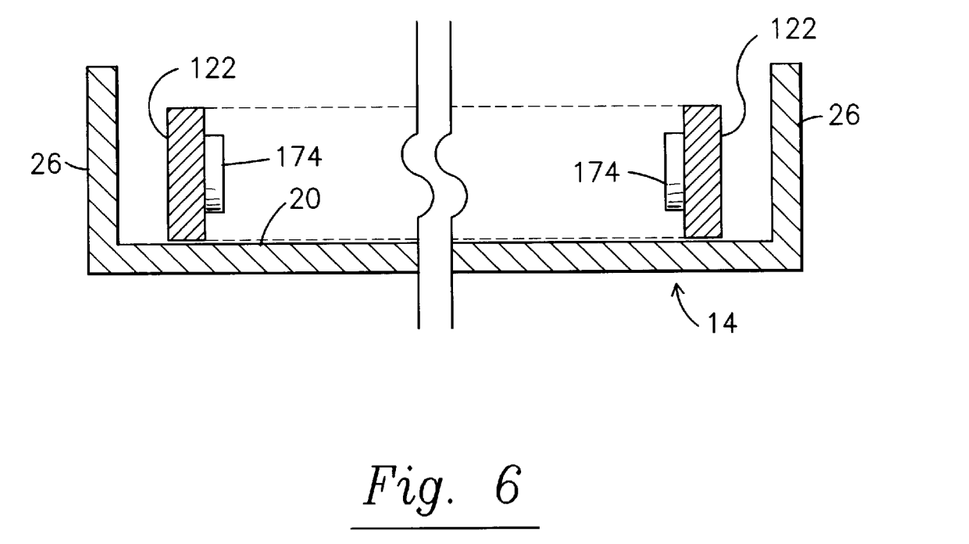
FIG. 6 is a cross-sectional front view of the adjustable frame of the present invention installed in a briefcase taken along line 6—6 of FIG. 4.
Figure 7:
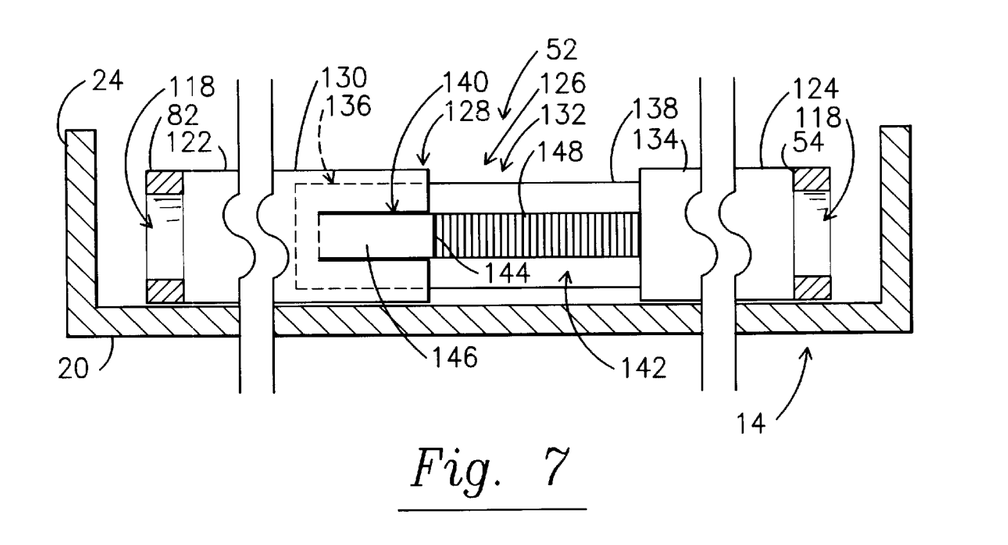
FIG. 7 is a cross-sectional side view of the adjustable frame of the present invention installed in a briefcase taken along line 7—7 of FIG. 4.

As best shown in FIGS. 2, 3 and 5, the outer end portions 110 and 112 of the first and second front frame sections 54 and 56 respectively and the outer end portions 114 and 116 of the first and second rear frame sections 82 and 84 respectively include a recess or cut-out portion 118 to accommodate protrusions or elements 120 formed in the lower side walls 26 of the briefcase 12 such as an ornamental or reinforcing side rib or a fold in an expanding briefcase.

Each side frame member 52 comprises a first and second side frame section indicated as 122 and 124 respectively slidably coupled together by a side frame member adjustment assembly generally indicated as 126 to permit relative movement therebetween to adjust the overall length of the side frame member 52 to accommodate briefcases 12 of various depths. Each side frame member adjustment assembly 126 comprises a first side frame adjustment element generally indicated as 128 formed on the inner end portion 130 of the first side frame section 122 and a second side frame adjustment element generally indicated as 132 formed on the inner end portion 134 of the second side frame section 124 to cooperatively engage each other and maintain the first side frame section 122 and the second side frame section 124 in coplanar alignment relative to each other. Each first side frame member adjustment element 128 comprises a slot 136 and the second side frame adjustment element 132 comprises a tongue 138 configured and dimensioned to be slidably disposed within the slot 136 to allow longitudinal adjustment therebetween. Each side frame member adjustment assembly 126 further includes a side frame lock assembly to selectively lock or secure the longitudinal position of the second side frame section 124 relative to the first side frame section 122. In particular, each side frame lock assembly comprises a first side frame lock element generally indicated as 140 formed on the first side frame section 122 adjacent to the first side frame adjustment element 128 and a second side frame lock element 142 formed on the second side frame section 124 adjacent the second side frame adjustment element 132. Each first side frame lock element 140 comprises a tooth 144 coupled to the first side frame section 122 by a flexible member 146 movable between a first or locked position and a second or unlocked position as described more fully hereinafter. Each second side frame lock element 142 comprises a plurality of grooves and ridges 148 disposed to engage the tooth 144 when in the first or locked position.

As best shown in FIG. 3, the adjustable frame 47 further includes a frame adjustment assembly to selectively adjust the side frame members 52 laterally relative to the front and rear frame members 48 and 50 to adjust the distance between the side frame members 52 such that the adjustable frame 47 can be varied to accommodate portable computers (not shown) of various sizes. Specifically, the frame adjustment assembly comprises a first frame adjustment means generally indicated as 150 formed on the outer end portions 110 and 112 of the first and second front frame sections 54 and 56 respectively and the outer end portions 114 and 116 of the first and second rear frame sections 82 and 84 respectively and a second frame adjustment means generally indicated as 152 formed on the outer end portions 154 and 156 of the first and second side frame sections 122 and 124 respectively. Each first frame adjustment means 150 comprises at least two first recesses or apertures each indicated as 158 disposed in spaced relationship relative to each other along the length or longitudinal axis of the corresponding first and second front frame sections 54 and 56, and first and second rear frame sections 82 and 84; while, each second frame adjustment means 152 comprises at least one first member 160 configured to selectively engage one of the recesses or apertures 158 to secure the side frame member 152 between the front and rear frame members 48 and 50. By moving the side frame members 52 laterally relative to the length or longitudinal axis of the front and rear frame members 48 and 50 and the recesses or apertures 158 the space therebetween is adjusted to receive portable computers (not shown) of different widths to limit lateral movement thereof. To stabilize the side frame members 52 relative to the front and rear frame members 48 and 50, at least two second recesses or apertures each indicated as 162 and a corresponding second member 164 may be formed in vertically spaced relationship relative to the first recesses or apertures 158 and first member 160 respectively.

As best shown in FIG. 1, the briefcase adapter 10 may further comprise a panel 166 to cover the adjustable frame and partition the briefcase into an upper and lower compartment. The panel 166 may be movable between an open and closed position coupled to the rear frame member 50 of the adjustable frame 47 by a pair of attachment members each indicated as 168. The attachment 168 may comprise a flexible element or other suitable connector. A panel securing means comprising a first panel securing element 170 mounted on the panel 166 and a second panel securing element 172 mounted on the front frame member 48 of the adjustable frame 47 disposed to engage the second panel securing element 170 when the panel 166 is in the closed position to secure the portable computer (not shown) in the compartment or area cooperatively formed by the briefcase adapter 10; that is, the adjustable frame 47 and the panel 166, and the substantially flat bottom panel 20. The first and second panel securing elements 170 and 172 may comprise a hook and loop combination or other suitable cooperative fastening means.

As best shown in FIG. 1, pads or cushions 174 may be mounted on the front and rear frame members 48 and 50 and the side frame members 52 to engage the portable computer (not shown) disposed within the compartment to protect the portable computer (not shown) from shock or impact.

Figure 8:
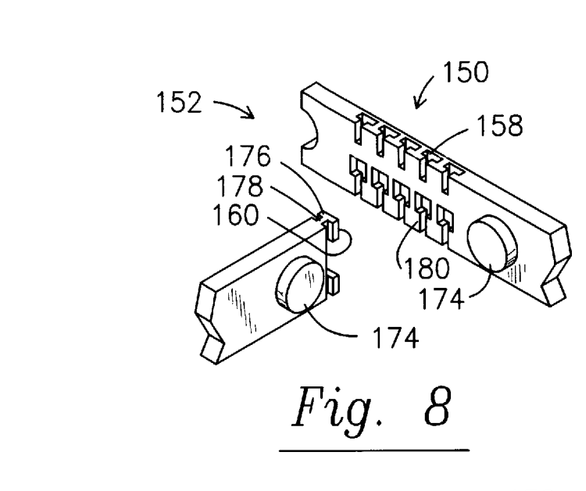
FIGS. 8 through 12 are partial perspective views of alternate embodiments of the frame adjustment assembly of the present invention.

FIG. 8 shows an alternate embodiment of the frame adjustment assembly wherein the first member 160 of the second frame adjustment means 152 comprises a flange 176 and web 178 and the recesses or apertures 158 of the first adjustment means 150 are configured to receive the flange 176 and web 178 in a first or open position such that the flange 176 may be freely inserted into the first adjustment means 150 and slidably moved to a second or locked position such that the flange 176 is held within the first adjustment means 150 by at least one flange retaining fin 180 to secure the second frame adjustment means 152 within the first adjustment means 150.

Figure 9:
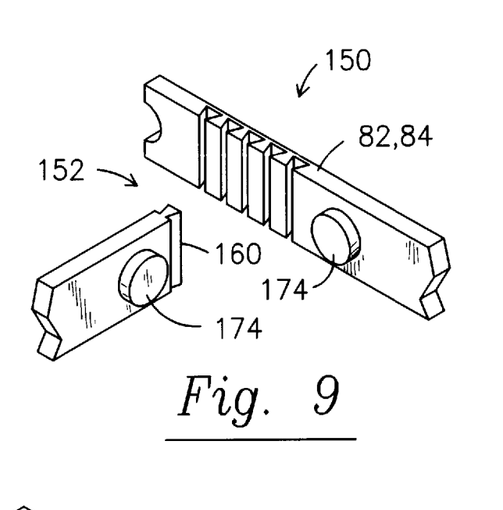
Figure 10:
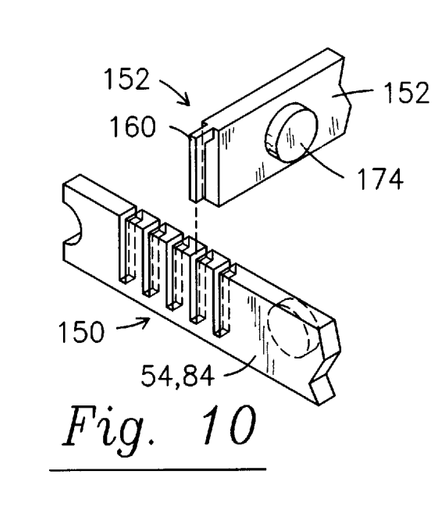
Figure 11:
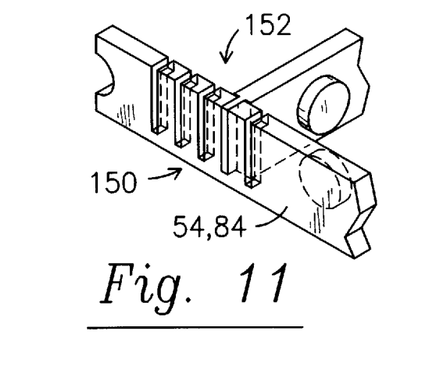

FIGS. 9 through 11 show further alternate embodiments of the frame adjustment assembly wherein the first member 160 of the second frame adjustment means 152 is tapered to be inserted into the first adjustment means 150 at one side of the first and second front frame sections 54 and 56, and first and second rear frame sections 82 and 84, and slidably moved within the first frame adjustment means 150 to secure the second frame adjustment means 152 within the first adjustment means 150.

Figure 12:
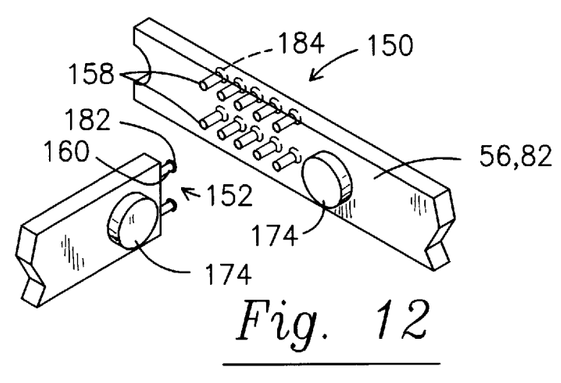

FIG. 12 shows a still further alternate embodiment of the frame adjustment assembly wherein the first member 160 of the second frame adjustment means 152 terminates in a flare 182 fabricated from a compressible material with a memory causing the flare 182 to return to normal dimensions after compressing forces are removed, such that the second frame adjustment means 152 can be inserted within the recesses or apertures 158 of the first frame adjustment means 150 which is tapered such that as the flare 182 is initially pressed into the first frame adjustment means 150, the flare 182 is compressed by a recess or aperture 158 initially narrower than the dimensions of the flare 182, but expands later into a larger internal cavity generally indicated as 184 larger than the facing dimensions of the recess or aperture 158, thereby securing the second adjustment 152 means within the first adjustment means 150.

Figure 13:
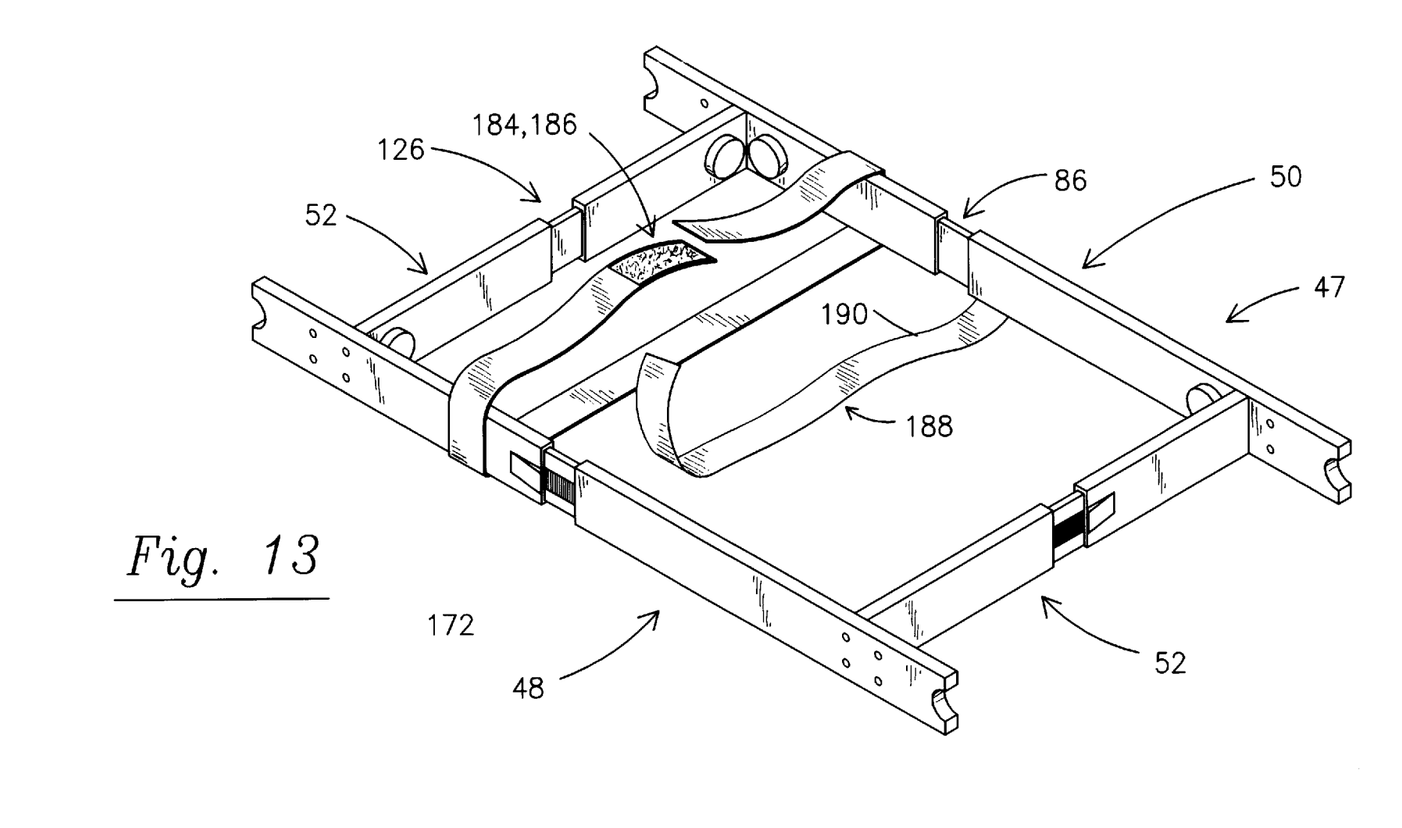
FIG. 13 is a perspective view of the adjustable frame of the present invention.

As best shown in FIG. 13, the adjustable frame 47 further includes a computer securing means generally indicated as 184 to secure the portable computer (not shown) within the compartment cooperatively formed by the adjustable frame 47, the panel 166 and the substantially flat bottom panel 20 of the briefcase. The computer securing means 184 may comprise a strap 186 cooperatively coupled to the adjustable frame 47, selectively adjustable between a first or open position and a second or secured position with a hook and loop combination or other suitable cooperative fastening means.

As best shown in FIG. 13, the adjustable frame 47 further includes a computer removing means generally indicated as 188 to remove the portable computer (not shown) from the compartment cooperatively formed by the adjustable frame 47, the panel 166 and the substantially flat bottom panel 20 of the briefcase. The computer removing means 188 may comprise a strap 190 fastened to the adjustable frame 47.

In use, the briefcase adapter 10 may be installed in a briefcase 12 by using the front frame member adjustment assembly 58 and the rear frame member adjustment assembly 86 to initially adjust the length of the front and rear frame members 48 and 50 respectively to the adjustment most closely approximating the distance between the lower side walls 26 of the briefcase 12; and using the frame adjustment assembly to adjust the spacing between the side frame members 52 and the side frame member adjustment assemblies 126 to adjust the spacing between the front and rear frame members 48 and 50 for snugly accommodating the portable computer (not shown) within the rectangular compartment or area cooperatively formed between the front and rear frame members 48 and 50 and the side frame members 52. The front frame member adjustment assembly 58 may then be used to reduce the length of the front frame member 48 so that the briefcase adapter 10 may then be loosely fitted into the lower peripheral wall of the briefcase 12 above the substantially flat bottom wall 20 and oriented so that the front and rear frame members 48 and 50 are substantially perpendicular to the lower side walls of the briefcase 12. Finally, the front frame member adjustment assembly 58 may then be used to increase the length of the front frame member 48 and the rear frame member 50 so the outer end portions 110 and 112 of the first and second front frame sections 54 and 56 and of the first and second rear frame sections 82 and 84 are abutted against the lower side walls of the briefcase 12 to frictionally hold the briefcase adapter 10 within the briefcase 12 such that the portable computer (not shown) may then be received within the compartment cooperatively formed by the adjustable frame 47, the panel 166 and the substantially flat bottom panel 20 of the briefcase.

It will thus be seen that the objects set forth above, and those made apparent from the preceding description are efficiently and cost-effectively attained and since certain changes may be made in the invention, it is intended that all matter contained in the above description or shown in the accompanying drawings shall be interpreted as illustrative and not in a limiting sense. It is also to be understood that the following claims are intended to cover all of the generic and specific features of the invention which as a matter of language might be said to fall therebetween.

I claim:

1. A briefcase adapter for carrying a portable computer in briefcases of various sizes including a compartment with a plurality of briefcase sides and a bottom panel, said briefcase adapter comprising:

an adjustable frame including a front frame member and a rear frame member held in spaced relationship relative to each other by a pair of side frame members disposed in spaced relationship to each other;

a front frame member adjustment means to selectively adjust the length of said front frame member to engage and be adjustably fitted to opposing sides of the briefcase;

a rear frame member adjustment means to selectively adjust the length of said rear frame member to engage and be adjustable fitted to opposing sides of the briefcase; and a pair of side frame member adjustment means to selectively adjust said spacing between said front frame member and rear frame member, whereby said adjustable frame may be adapted for fitting with briefcases of various widths and adjusted to accomodate portable computers of various sizes.

2. The briefcase adapter in claim 1, further comprising a frame adjustment assembly to selectively and lockably adjust said spacing between said side frame members for selectively adjusting one dimension of the compartment cooperatively formed between said front and rear frame members and said side frame members to accommodate the portable computer therein.

3. The briefcase adapter in claim 2, wherein said frame adjustment assembly comprises four first frame adjustment means, two formed on the first frame member and two formed on the second frame member and a second frame adjustment means formed on each outer end portion of each side frame member, each said second frame adjustment means configured to selectively engage a corresponding first frame adjustment means to cooperatively adjust one dimension of the compartment cooperatively formed between said front and rear frame members and said side frame members to accommodate the portable computer therein.

4. The briefcase adapter in claim 2, further comprising a front frame locking means to selectively fix the length of said front frame member and a rear frame locking means to selectively fix the length of said rear frame member.

5. The briefcase adapter in claim 4, further comprising a pair of side frame locking means to selectively fix said spacing between said front frame member and said rear frame member.

6. The briefcase adapter in claim 5, for a briefcase further including protrusions extending from one or more of the side walls of the briefcase, wherein said front frame member comprises a first front frame section and a second front frame section; said rear frame member comprises a first rear frame section and a second rear frame section; each said side frame member comprises a first side frame section and a second side frame section;

said front frame member adjustment means comprises a first front frame adjustment element formed on said first front frame section and a second front frame adjustment element formed on said second front frame section configured to cooperatively engage each other and maintain said first front frame section in coplanar alignment relative to each other and to allow longitudinal adjustment therebetween;

said rear frame member adjustment means comprises a first rear frame adjustment element formed on said first rear frame section and a second rear frame adjustment element formed on said second rear frame section configured to cooperatively engage each other and maintain said first rear frame section in coplanar alignment relative to each other and to allow longitudinal adjustment therebetween;

said front frame locking means comprises a first front lock element formed on said first front frame section and a second front frame lock element formed on said second front frame section to cooperatively engage said first front lock element to selectively fix the longitudinal adjustment between said first front frame section and said second front frame section; and said rear frame locking means comprises a first rear lock element formed on said first rear frame section and a second rear frame lock element formed on said second rear frame section to cooperatively engage said first rear lock element to selectively fix the longitudinal adjustment between said first rear frame section and said second rear frame section;

each said side frame member adjustment means comprises a first side frame member adjustment element formed on said corresponding first side frame section and a second side frame member adjustment element formed on said corresponding second side frame section configured to cooperatively engage each other and maintain said corresponding first side frame section and second side frame section in coplanar alignment relative to each other and to allow longitudinal adjustment therebetween;

each said side frame locking means comprises a first side frame lock element formed on said corresponding first side frame section and a second side frame lock element formed on said corresponding second side frame section to cooperatively engage a corresponding first side lock element to selectively fix the longitudinal adjustment between said corresponding first side frame section and said corresponding second side frame section;

said frame adjustment assembly comprises four first frame adjustment means, two formed on the first frame member and two formed on the second frame member and a second frame adjustment means formed on each outer end portion of each side frame member, each said second frame adjustment means configured to selectively engage said corresponding first frame adjustment means to cooperatively adjust one dimension of the compartment cooperatively formed between said front and rear frame members and said side frame members to accommodate the portable computer therein;

at least one of the outer end portions of said front frame member and said rear frame member further is shaped to form at least one recess to accommodate the protrusions in the side of the briefcase when said front frame member is adjusted by said front frame member adjustment means and locked by said front frame member locking means and said rear frame member is adjusted by said rear frame member adjustment means and locked by said rear frame member locking means to frictionally hold said adjustable frame against opposing briefcase sides to secure said adjustable frame within the briefcase; and computer securing means to secure the portable computer within the compartment cooperatively formed by said adjustable frame, said panel and said bottom panel of the briefcase.

7. The briefcase adapter in claim 6, wherein each said first side lock element comprises a tooth coupled to said corresponding first side frame section by a flexible member movable between a first or locked position and a second or unlocked position;

each said second side frame lock element comprises a plurality of grooves and ridges disposed to engage said corresponding tooth when said flexible member is in said first or locked position;

said first front lock element comprises a tooth coupled to said first front frame section by a flexible member movable between a first or locked position and a second or unlocked position;

said second front frame lock element comprises a plurality of grooves and ridges disposed to engage said tooth when said flexible member is in said first or locked position;

said first rear lock element comprises a tooth coupled to said first rear frame section by a flexible member movable between a first or locked position and a second or unlocked position;

said second rear frame lock element comprises a plurality of grooves and ridges disposed to engage said tooth when said flexible member is in said first or locked position; and a computer removing means to remove the portable computer from the compartment cooperatively formed by said adjustable frame, said panel and said bottom panel of the briefcase.

8. The briefcase adapter in claim 2, further comprising a pair of side frame locking means to selectively fix said spacing between said front frame member and said rear frame member.

9. The briefcase adapter in claim 1, further comprising a front frame locking means to selectively fix the length of said front frame member and a rear frame locking means to selectively fix the length of said rear frame member.

10. The briefcase adapter in claim 9, wherein said front frame member comprises a first front frame section and a second front frame section;

said rear frame member comprises a first rear frame section and a second rear frame section;

said front frame member adjustment means comprises a first front frame adjustment element formed on said first front frame section and a second front frame adjustment element formed on said second front frame section configured to cooperatively engage each other and maintain said first front frame section in coplanar alignment relative to each other and to allow longitudinal adjustment therebetween;

said rear frame member adjustment means comprises a first rear frame adjustment element formed on said first rear frame section and a second rear frame adjustment element formed on said second rear frame section configured to cooperatively engage each other and maintain said first rear frame section in coplanar alignment relative to each other and to allow longitudinal adjustment therebetween;

said front frame locking means comprises a first front lock element formed on said first front frame section and a second front frame lock element formed on said second front frame section to cooperatively engage said first front lock element to selectively fix the longitudinal adjustment between said first front frame section and said second front frame section; and said rear frame locking means comprises a first rear lock element formed on said first rear frame section and a second rear frame lock element formed on said second rear frame section to cooperatively engage said first rear lock element to selectively fix the longitudinal adjustment between said first rear frame section and said second rear frame section.

11. The briefcase adapter in claim 10, wherein said first front lock element comprises a tooth coupled to said first front frame section by a flexible member movable between a first or locked position and a second or unlocked position and said second front frame lock element comprises a plurality of grooves and ridges disposed to engage said tooth when said flexible member is in said first or locked position.

said first rear lock element comprises a tooth coupled to said first rear frame section by a flexible member movable between a first or locked position and a second or unlocked position and said second rear frame lock element comprises a plurality of grooves and ridges disposed to engage said tooth when said flexible member is in said first or locked position.

12. The briefcase adapter in claim 9, further comprising a pair of side frame locking means to selectively fix said spacing between said front frame member and said rear frame member.

13. The briefcase adapter in claim 1, further comprising a pair of side frame locking means to selectively fix said spacing between said front frame member and said rear frame member.

14. The briefcase adapter in claim 13, wherein each said side frame member comprises a first side frame section and a second side frame section;

each said side frame member adjustment means comprises a first side frame member adjustment element formed on said corresponding first side frame section and a second side frame member adjustment element formed on said corresponding second side frame section configured to cooperatively engage each other and maintain said corresponding first side frame section and second side frame section in coplanar alignment relative to each other and to allow longitudinal adjustment therebetween; and each said side frame locking means comprises a first side frame lock element formed on said corresponding first side frame section and a second side frame lock element formed on said corresponding second side frame section to cooperatively engage said corresponding first side lock element to selectively fix the longitudinal adjustment between said corresponding first side frame section and said corresponding second side frame section.

15. The briefcase adapter in claim 14, wherein each said first side lock element comprises a tooth coupled to said corresponding first side frame section by a flexible member movable between a first or locked position and a second or unlocked position and each said second side frame lock element comprises a plurality of grooves and ridges disposed to engage said corresponding tooth when said flexible member is in said first or locked position.

16. The briefcase adapter in claim 1 for a briefcase further including protrusions extending from one or more of the side walls of the briefcase, wherein at least one of the outer end portions of said front frame member and said rear frame member further is shaped to form at least one recess to accommodate the protrusions in the side of the briefcase when said front frame member is adjusted by said front frame member adjustment means and locked by said front frame member locking means and said rear frame member is adjusted by said rear frame member adjustment means and locked by said rear frame member locking means to frictionally hold said adjustable frame against opposing briefcase sides to secure said adjustable frame within the briefcase.

17. The briefcase adapter in claim 1 wherein:

said front frame member and said rear frame member are in substantially parallel relationship relative to each other; said side frame members are in substantially parallel relationship relative to each other; and each side frame member is in substantially perpendicular relationship relative to said front frame member and to said rear frame member.

18. The briefcase adapter in claim 1 wherein the briefcase adapter further comprises a panel movable between an open and closed position and mounted on said rear frame member by an attachment means.

19. The briefcase adapter in claim 1 wherein said adjustable frame further comprises:

computer securing means to secure the portable computer within the compartment cooperatively formed by said adjustable frame, said panel and said bottom panel of the briefcase; and a computer removing means to remove the portable computer from the compartment cooperatively formed by said adjustable frame, said panel and said bottom panel of the briefcase.

20. A briefcase adapter for carrying a portable computer in a briefcase including a compartment with a plurality of briefcase sides and a bottom panel, said briefcase adapter comprising:

an adjustable frame including a front frame member comprising a first front frame section and a second front frame section; and a rear frame member comprising a first rear frame section and a second rear frame section;

a pair of side frame members each said side frame member comprising a first side frame section and a second side frame section;

a front frame member adjustment assembly, comprising a first front frame adjustment element formed on said first front frame section and a second front frame adjustment element formed on said second front frame section configured to cooperatively engage each other and maintain said first front frame section in coplanar alignment relative to each other and to allow longitudinal adjustment therebetween to selectively adjust the length of said front frame member to engage opposing sides of the briefcase;

a front frame locking assembly, comprising a first front lock element formed on said first front frame section and a second front frame lock element formed on said second front frame section to cooperatively engage said first front lock element to selectively fix the longitudinal adjustment between said first front frame section and said second front frame section to selectively fix the length of said front frame member;

a rear frame member adjustment assembly, comprising a first rear frame adjustment element formed on said first rear frame section and a second rear frame adjustment element formed on said second rear frame section configured to cooperatively engage each other and maintain said first rear frame section in coplanar alignment relative to each other and to allow longitudinal adjustment therebetween to selectively adjust the length of said rear frame member to engage opposing sides of the briefcase;

a rear frame locking assembly, comprising a first rear lock element formed on said first rear frame section and a second rear frame lock element formed on said second rear frame section to cooperatively engage said first rear lock element to selectively fix the longitudinal adjustment between said first rear frame section and said second rear frame section to selectively fix the length of said rear frame member;

a pair of side frame member adjustment assembly, comprising a first side frame member adjustment element formed on said corresponding first side frame section and a second side frame member adjustment element formed on said corresponding second side frame section configured to cooperatively engage each other and maintain said corresponding first side frame section and second side frame section in coplanar alignment relative to each other and to allow longitudinal adjustment therebetween to selectively adjust said spacing between said front frame member and rear frame member;

a pair of side frame locking assemblies, each comprising a first side frame lock element formed on said corresponding first side frame section and a second side frame lock element formed on said corresponding second side frame section to cooperatively engage said corresponding first side lock element to selectively fix the longitudinal adjustment between said corresponding first side frame section and said corresponding second side frame section to selectively fix said spacing between said corresponding front frame member and said corresponding rear frame member.

a frame adjustment assembly to selectively and lockably adjust said spacing between said side frame members for selectively adjusting one dimension of the compartment cooperatively formed between said front and rear frame members and said side frame members to accommodate the portable computer therein;

a computer securing means to secure the portable computer within the compartment cooperatively formed by said adjustable frame, said panel and said bottom panel of the briefcase; and a computer removing means to remove the portable computer from the compartment cooperatively formed by said adjustable frame, said panel and said bottom panel of the briefcase, said side frame members held in substantially parallel spaced relationship to each other between said front frame member and rear frame member, and said first frame member and said rear frame member held in substantially parallel spaced relationship relative to each other and in substantially perpendicular relationship relative to each said side frame member; and a panel movable between an open and closed position and mounted on said rear frame member by an attachment means.

21. The briefcase adapter in claim 20 for a briefcase further including protrusions extending from one or more of the side walls of the briefcase, wherein said first front lock element comprises a tooth coupled to said first front frame section by a flexible member movable between a first or locked position and a second or unlocked position;

said second front frame lock element comprises a plurality of grooves and ridges disposed to engage said tooth when said flexible member is in said first or locked position;

said first rear lock element comprises a tooth coupled to said first rear frame section by a flexible member movable between a first or locked position and a second or unlocked position;

said second rear frame lock element comprises a plurality of grooves and ridges disposed to engage said tooth when said flexible member is in said first or locked position;

each said first side lock element comprises a tooth coupled to said corresponding first side frame section by a flexible member movable between a first or locked position and a second or unlocked position each said second side frame lock element comprises a plurality of grooves and ridges disposed to engage said corresponding tooth when said flexible member is in said first or locked position; and at least one of the outer end portions of said front frame member and said rear frame member further is shaped to form at least one recess to accommodate the protrusions when said front frame member is adjusted by said front frame member adjustment means and locked by said front frame member locking means and said rear frame member is adjusted by said rear frame member adjustment means and locked by said rear frame member locking means to frictionally hold said adjustable frame against opposing briefcase sides to secure said adjustable frame within the briefcase.

22. A briefcase adapter for carrying a portable computer in a briefcase including a compartment with a plurality of briefcase sides and a bottom panel, said briefcase adapter comprising:

an adjustable frame including
a front frame member including a first front frame section and a second front frame section; and
a rear frame member including a first rear frame section and a second rear frame section, said front frame member and rear frame member held in spaced relationship relative to each other by a pair of side frame members disposed in spaced relationship to each other;

a front frame member adjustment means to selectively adjust the length of said front frame member to engage opposing sides of the briefcase, including a first front frame adjustment element formed on said first front frame section and a second front frame adjustment element formed on said second front frame section configured to cooperatively engage each other and maintain said first front frame section in coplanar alignment relative to each other and to allow longitudinal adjustment therebetween;

a rear frame member adjustment means to selectively adjust the length of said rear frame member to engage opposing sides of the briefcase, including a first rear frame adjustment element formed on said first rear frame section and a second rear frame adjustment element formed on said second rear frame section configured to cooperatively engage each other and maintain said first rear frame section in coplanar alignment relative to each other and to allow longitudinal adjustment therebetween; and a pair of side frame member adjustment means to selectively adjust said spacing between said front frame member and rear frame member.

* * * * *

UNITED STATES PATENT AND TRADEMARK OFFICE
CERTIFICATE OF CORRECTION

PATENT NO. : 5,857,568
DATED : January 12, 1999
INVENTOR(S) : John D. Speirs

It is certified that error appears in the above-identified patent and that said Letters Patent is hereby corrected as shown below:

In column 8, line 24, change the word "adjustable" to --adjustably--.

In column 8, line 30, change the word "accomodate" to --accommodate--.

On the title page, after item [75], change "325 Oak Leaf Cir., Lake Mary, Fla. 32746" to --1009 Park Place, Hendersonville, NC 28792--.

Signed and Sealed this

Sixth Day of July, 1999

Attest:

Q. TODD DICKINSON

*Attesting Officer*    *Acting Commissioner of Patents and Trademarks*